United States Patent
Beck

(10) Patent No.: US 6,820,270 B1
(45) Date of Patent: Nov. 16, 2004

(54) PROGRAMMING DEVICE

(75) Inventor: Hans-Joachim Beck, Rheinstetten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/446,834

(22) PCT Filed: Apr. 21, 2000

(86) PCT No.: PCT/DE99/01253
§ 371 (c)(1),
(2), (4) Date: Apr. 14, 2000

(87) PCT Pub. No.: WO99/56203
PCT Pub. Date: Nov. 4, 1999

(30) Foreign Application Priority Data

Apr. 28, 1998 (DE) .................................. 298 07 670 U

(51) Int. Cl.⁷ .............................................. G06F 9/455
(52) U.S. Cl. ........................ 719/332; 719/331; 717/165
(58) Field of Search ................................ 719/310, 315, 719/316, 332; 717/100, 108, 104, 116

(56) References Cited

U.S. PATENT DOCUMENTS

| 5,261,098 A | * | 11/1993 | Katin et al. ..................... 707/1 |
| 5,297,291 A | | 3/1994 | Murphy |
| 5,418,964 A | * | 5/1995 | Conner et al. .............. 709/316 |
| 5,493,680 A | * | 2/1996 | Danforth .................... 717/108 |
| 5,692,195 A | * | 11/1997 | Conner et al. .............. 709/316 |
| 5,732,271 A | * | 3/1998 | Berry et al. ................ 709/316 |
| 5,822,587 A | * | 10/1998 | McDonald et al. ......... 717/108 |
| 5,978,582 A | * | 11/1999 | McDonald et al. ......... 717/104 |
| 6,263,492 B1 | * | 7/2001 | Fraley et al. ............... 717/107 |
| 6,480,856 B1 | * | 11/2002 | McDonald et al. ......... 707/100 |

FOREIGN PATENT DOCUMENTS

| DE | 41 08 309 | 9/1992 |
| DE | 41 31 380 | 3/1993 |
| DE | 42 06 567 | 5/1993 |
| EP | 0 702 291 | 3/1996 |
| EP | 0 725 337 | 8/1996 |

OTHER PUBLICATIONS

Microsoft Press. "Computer Dictionary, Second Edition". 1994, p. 334, reference definition.*

Object–Oriented Programming In C—The Linneaus System, IBM Technical Disclosure Bulletin, vol. 32, No. 9B, Feb. 1990.

* cited by examiner

Primary Examiner—Lewis A. Bullock, Jr.
(74) Attorney, Agent, or Firm—Staas & Halsey LLP

(57) ABSTRACT

In order to reduce the data volume in constituting multiple instances from a type, a programming device is provided, having a software tool for processing objects, of which a first object, equipped with data, is provided as model for a second object that has a pointer with which, at the beginning of an access to the second object, the data of the first object can be incorporated into the second object by the software tool.

2 Claims, 2 Drawing Sheets

PROGRAMMING DEVICE

FIELD OF THE INVENTION

The present invention relates to a programming device having a software tool for processing objects, of which a first object, equipped with data, is provided as model for a second object that has a pointer with which, at the beginning of an access to the second object, the data of the first object can be incorporated into the second object by the software tool.

BACKGROUND OF THE INVENTION

Data are often stored in a first object in the form of a type and in a second object in the form of an instance, the type being provided as model for the instance. An instance usually comprises both the instance-specific and the type-specific data, the result being that the type-specific data need to be stored several times in a memory of the programming device. If, for example, n instances are applied to a type, the type-specific data usually need to be stored (n+1) times, which means a very large data volume.

SUMMARY

It is an object of the present invention to reduce the data volume in a programming device when creating multiple instances from a type.

This object is achieved with a programming device according to the present invention.

According to the present invention, only the instance-specific data and a reference (pointer) to the type are deposited in the instance. The type-specific data are not incorporated into the instance until a data access to the instance begins.

In an embodiment of the present invention, provision is made for at least one data group of the first object to be depositable by the software tool into the second object, the result being that at the beginning of an access to the second object, the software tool does not incorporate this data group of the first object into the second object.

This makes it possible for a data modification in a type to have either an influence or no influence on the data in an instance constituted with that type. A programmer can thus choose whether future data modifications in the type are to have an affect on the instance data.

DETAILED DESCRIPTION

Figure 1:
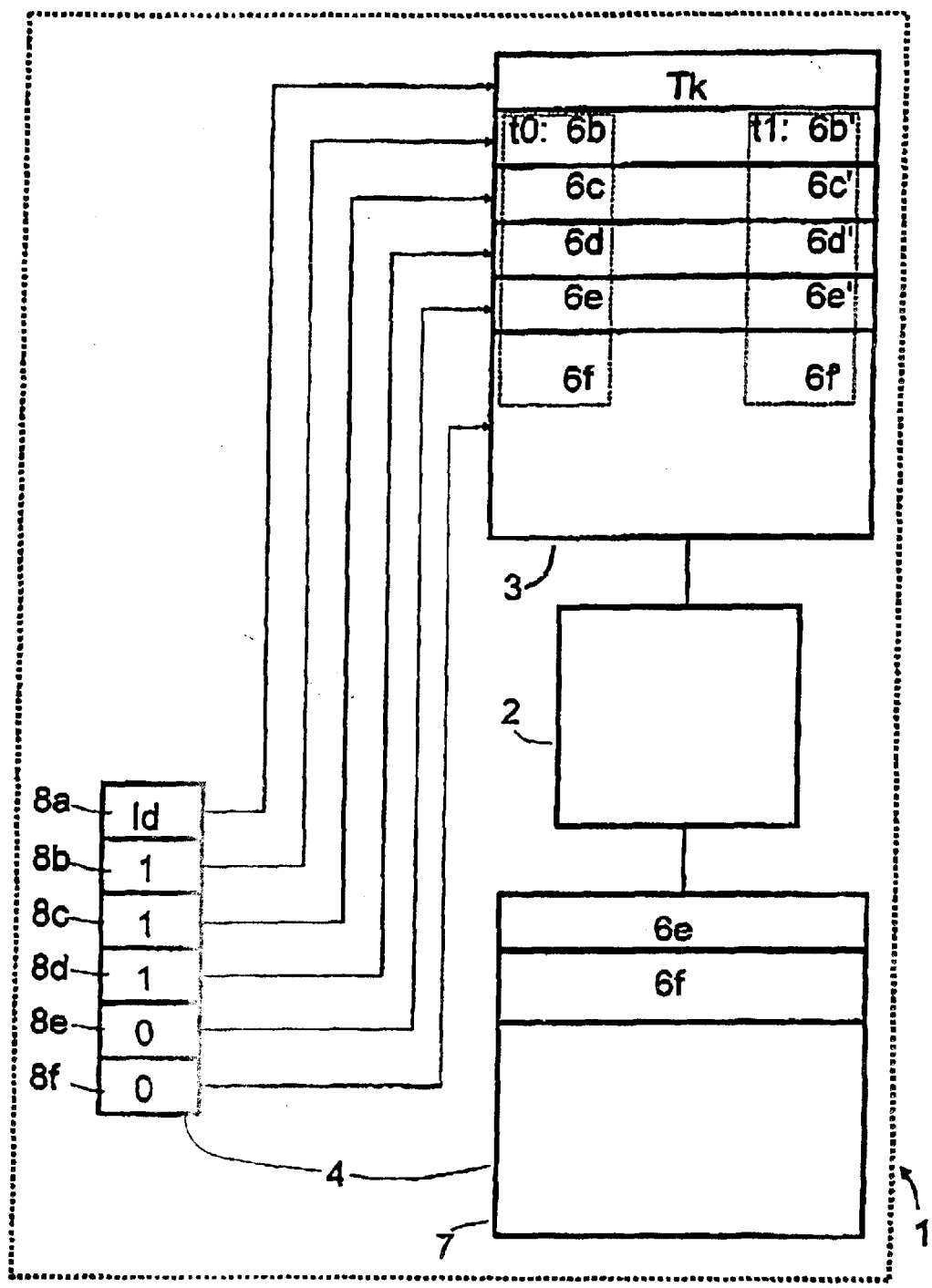
FIGS. 1 and 2 show, in a schematic depiction, a memory of a programming device having software objects.

In FIG. 1, the reference number 1 designates a main memory of a programming device into which a software tool 2, a first object in the form of a type 3, and a second object in the form of an instance 4 are loaded. Type 3 serves as model for instance 4, and comprises a type identifier Tk and data subdivided into data groups 6b through 6f, a data group comprising, for example, a width of 8 bits or a width of only one bit. Prior to a data access, instance 4 has only instance-specific data 7 and an attribute list, which in the present example comprises six fields 8a, 8b through 8f. Field 8a is occupied by a pointer Id for addressing type 3 with type identifier Tk; fields 8b through 8f, which are associated with data groups 6b through 6f of type 3, are occupied by attributes which indicate whether at the beginning of an access to the instance data, the data to be incorporated by software tool 2 in the event of a data modification in data groups 6b through 6f of type 3 are the modified data or the data valid prior to that modification.

Figure 2:
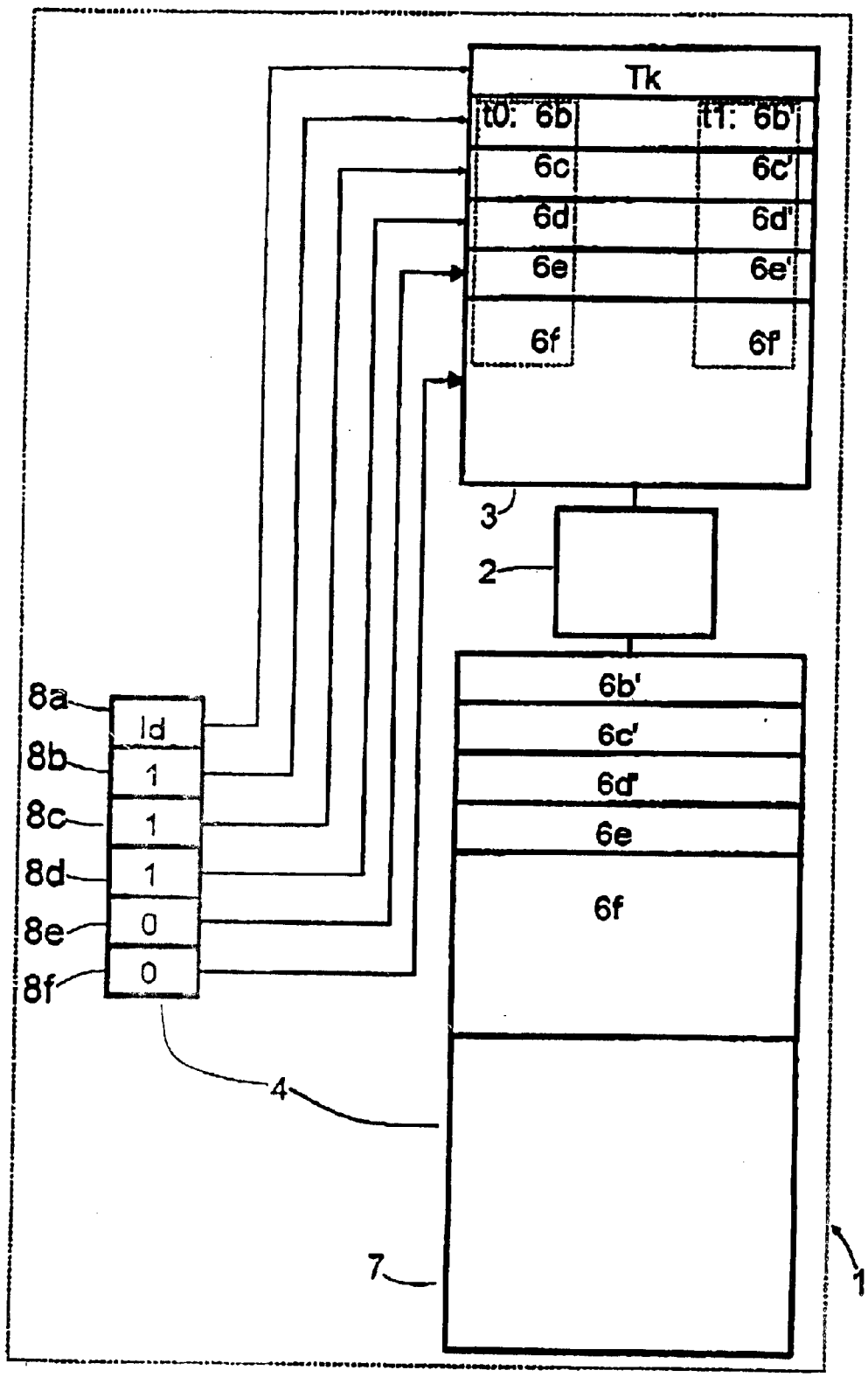

It is assumed hereinafter that fields 8b, 8c, and 8d are occupied by an attribute 1, and fields 8e and 8f by an attribute 0. This means that the data modifications in data groups 6b through 6d of type 3, but not modifications in data groups 6e and 6f, are to be taken into account upon incorporation into instance 4. As a result, it is necessary for software tool 2 to write data groups 6e and 6f into instance 4 prior to any modification in those data. It is also assumed that the software tool created data groups 6b through 6f at a time t0 and modified them at a time t1, thereby deleting the data valid at that time. The modified data groups are labeled 6b' through 6f'. Before a user can access the instance data, the type data must first be incorporated by software tool 2 into instance 4 (FIG. 2). Corresponding to the occupancy of fields 8b through 8f of the attribute list, software tool 2 incorporates into instance 4 only the type data valid at time t1 (i.e. data groups 6b', 6c', and 6d'), but not the type data 6e' and 6f' valid at that time t1. After incorporation of the type data, the instance data which a user can now access comprise both the instance-specific data 7 and the type-specific data at time t0 and time t1, i.e. data groups 6b', 6c', 6d', 6e, and 6f.

The present invention considerably reduces the quantity of data that must be saved, since only the data modifiable at an instance are stored. The type data are incorporated into the instance only prior to an access to the instance data. A data modification to a type can selectably affect the instance data.

What is claimed is:

1. A programming device, comprising:
   a software tool processing objects;
   a first object in a form of a type having type-specific data groups; and
   a second object in a form of an instance, having instance-specific data groups and an attribute list, the first object being a model for the second object and the attribute list having attributes associated with said type-specific data groups in said first object, wherein the software tool incorporates selected groups of said type-specific data groups of the first object into the second object at a beginning of an access to the second object, said selected type-specific data groups being indicated by said attributes of said attribute list.

2. The programming device according to claim 1, wherein the software tool deposits at least one of said type-specific data groups, excluding a first data group of the first object into the second object, so that at the beginning of the access to the second object, the software tool does not incorporate the at least one of said type-specific data groups of the first object into the second object.

* * * * *